G. ORNSTEIN.
FLOW CONTROLLING APPARATUS.
APPLICATION FILED SEPT. 26, 1913.

1,233,394.

Patented July 17, 1917.
3 SHEETS—SHEET 2.

Attest:
Inventor:
Georg Ornstein
by Arthur L. Kent
his Atty

G. ORNSTEIN.
FLOW CONTROLLING APPARATUS.
APPLICATION FILED SEPT. 26, 1913.

1,233,394.

Patented July 17, 1917.
3 SHEETS—SHEET 3.

Attest:
Lillian R. Fox

Inventor:
Georg Ornstein
by Arthur L. Kent, his Atty

UNITED STATES PATENT OFFICE.

GEORG ORNSTEIN, OF NEW YORK, N. Y., ASSIGNOR TO ELECTRO BLEACHING GAS COMPANY, A CORPORATION OF NEW YORK.

FLOW-CONTROLLING APPARATUS.

1,233,394.

Specification of Letters Patent.    Patented July 17, 1917.

Application filed September 26, 1913. Serial No. 791,926.

*To all whom it may concern:*

Be it known that I, GEORG ORNSTEIN, a citizen of the German Empire, residing at New York city, in the county of New York and State of New York, have invented certain new and useful Improvements in Flow-Controlling Apparatus, fully described and represented in the following specification and the accompanying drawings, forming a part of the same.

This invention relates to apparatus for automatically controlling the flow of fluids, either gases or liquids, according to the flow of another fluid. The invention has been made especially with the idea of providing a practical, reliable apparatus whereby a sterilizing gas, and more particularly chlorin, may be added in suitable relatively small proportionate and automatically regulated amounts to flowing water, such as the water of city or town supplies or sewage or other watery liquids. The invention comprises an apparatus in which a flow regulating device is controlled according to the amount of fluid flowing in the controlling flow by means of electrically controlled mechanism, and the object of the invention is generally to provide such an apparatus including electrical controlling mechanism which shall be accurate and reliable in operation and of compact and comparatively simple construction.

A full understanding of the invention can best be given by a detailed description of an approved form of apparatus embodying the various features of the invention, and such a description will now be given in connection with the accompanying drawings illustrating an apparatus designed especially for treating flowing water with chlorin and in which the rate at which the chlorin is supplied and added to the water to be treated is controlled and determined by means of a pressure reducing and regulating valve to which the chlorin is supplied in a gaseous state under pressure, and in which such regulating valve is automatically adjusted by an electrical controlling mechanism, and in which the electrical controlling mechanism is controlled according to the velocity of flow of the water to be treated by means controlled by a difference in pressure developed in the flowing water.

In said drawings:—

Figure 1:
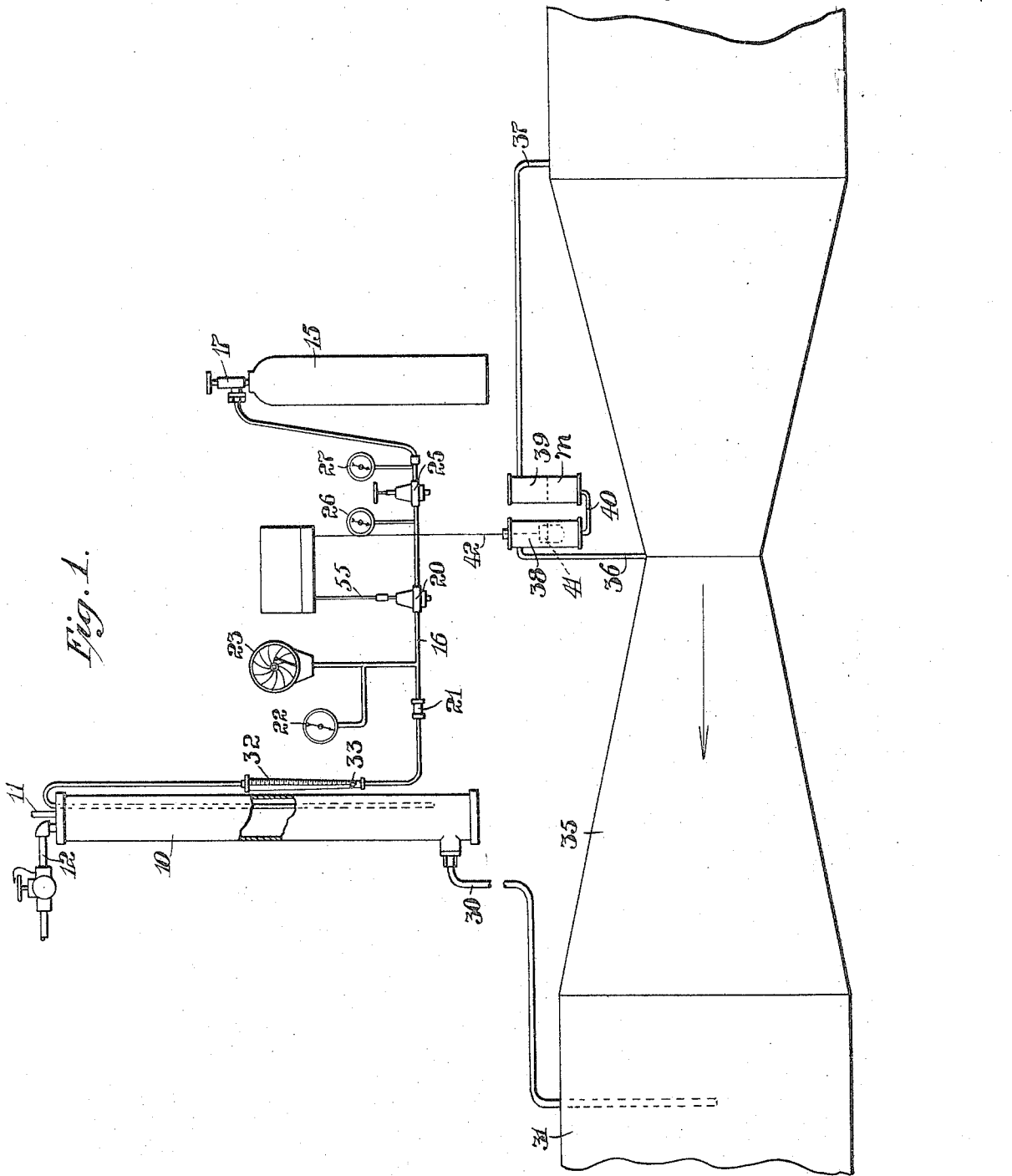
Figure 1 is a diagrammatical view of such an apparatus.

Referring to the drawings, and first briefly to the parts of the apparatus shown other than the electrical controlling mechanism, the apparatus is one in which the desired result of adding a definite quantity of chlorin to the flowing water to be treated is secured by supplying the chlorin gas at a regulated rate, causing it to be absorbed by a minor flow of water, and then discharging the chlorinated flow of water directly into the main body of water to be treated. The apparatus comprises an absorption tower 10 through which the minor flow of water passes downward to absorb an upwardly moving current of chlorin gas. The tower should be provided with a vent, as at 11, whereby the pressure within the tower is maintained at or substantially at atmospheric pressure. Water in suitably regulated quantity is supplied at the top of the tower through a supply pipe 12.

The chlorin in the apparatus shown is supplied from a tank 15 of compressed and liquefied chlorin gas from which a pipe 16 leads and which pipe 16 discharges into the lower part of the tower. The pipe 16 is shown as entered through the top of the tower and extended downward therein to the desired place of discharge near the bottom of the tower, this arrangement being for convenience in construction and at the same time to provide a portion of the pipe which extends downwardly toward the discharge end to protect the measuring and flow-adjusting apparatus from moisture which might otherwise diffuse backward from the tower. The chlorin tank is provided with the usual shut-off valve 17 and the supply pipe 16 is provided with or connects through a pressure reducing and regulating means matically adjusted in accordance with the present invention by means of an electrically controlled and electrically operated mechanism which in turn is controlled according to the quantity of water to be treated. Such control is most advantageously secured by providing means for controlling mechanism according to the velocity of flow of the water to be treated through a pressure difference developed by or in the flowing water. In the apparatus shown, the electrical controlling mechanism is controlled according to the velocity of flow of the water through the conduit 31 by means controlled by a difference in pressure developed in the flowing water by a Venturi tube interposed in the conduit 31. The Venturi tube is indicated at 35. From two suitable points of different pressures, as from the point of narrowest cross-section, or critical point, of the Venturi tube, and from a point at or adjacent to the beginning or inlet end thereof, lead pressure pipes 36 and 37 respectively. The pipe 36 connects into the upper part of a closed vertical chamber 38 and the pipe 37 leads to the upper part of a similar closed chamber 39. The chambers 38 and 39, which may be of the same size as shown or of other suitable relative sizes, are connected at the bottom, as by a pipe 40, and are partly filled with mercury or other suitable liquid of greater specific gravity than the water, as indicated at $m$. The two chambers with their connecting pipe 40 thus form a U-shaped chamber with enlarged arms or upright portions in which the level of the mercury or other heavy liquid will depend upon and vary with variations in the difference in pressure developed by the Venturi tube in the water flowing through the conduit 35. The mercury in the arm or chamber 38 will always be subjected to a pressure transmitted through the pipe 36 equal to the pressure in the conduit at the point where the pipe 36 connects with the conduit, that is, at the critical point of the Venturi tube in the apparatus shown in Fig. 1; and in like manner the mercury in the chamber or arm 39 will be subjected to a pressure transmitted through the pipe 37 equal to the pressure in the conduit at the point where this pipe enters the conduit. When there is no flow of water through the conduit these pressures will be equal, but when the water is flowing through the conduit and filling the conduit the pressure transmitted through the pipe 37 will be greater than that transmitted through the pipe 36 and the mercury will, therefore, be forced downward in the chamber 39 and upward in the chamber 38 and the surface level of the mercury in the two chambers will always be that at which the difference in head of the mercury in the two chambers balances the difference in pressure exerted on the surface of the mercury in the two chambers. In one of the pressure chambers a float 41 is provided to float on the surface of the mercury, and from this float a suitable connection, as the wire or small rod 42, leads upward through a stuffing box in the top of the chamber. This connecting rod or wire will thus have a movement corresponding to the rise and fall of the mercury in the chamber 38 caused by changes in velocity of flow of water through the conduit 31, and is connected to control the electrical controlling apparatus by which the valve 20 is operated to vary the supply of chlorin according to the variations in the amount of water to be treated.

Figure 2:
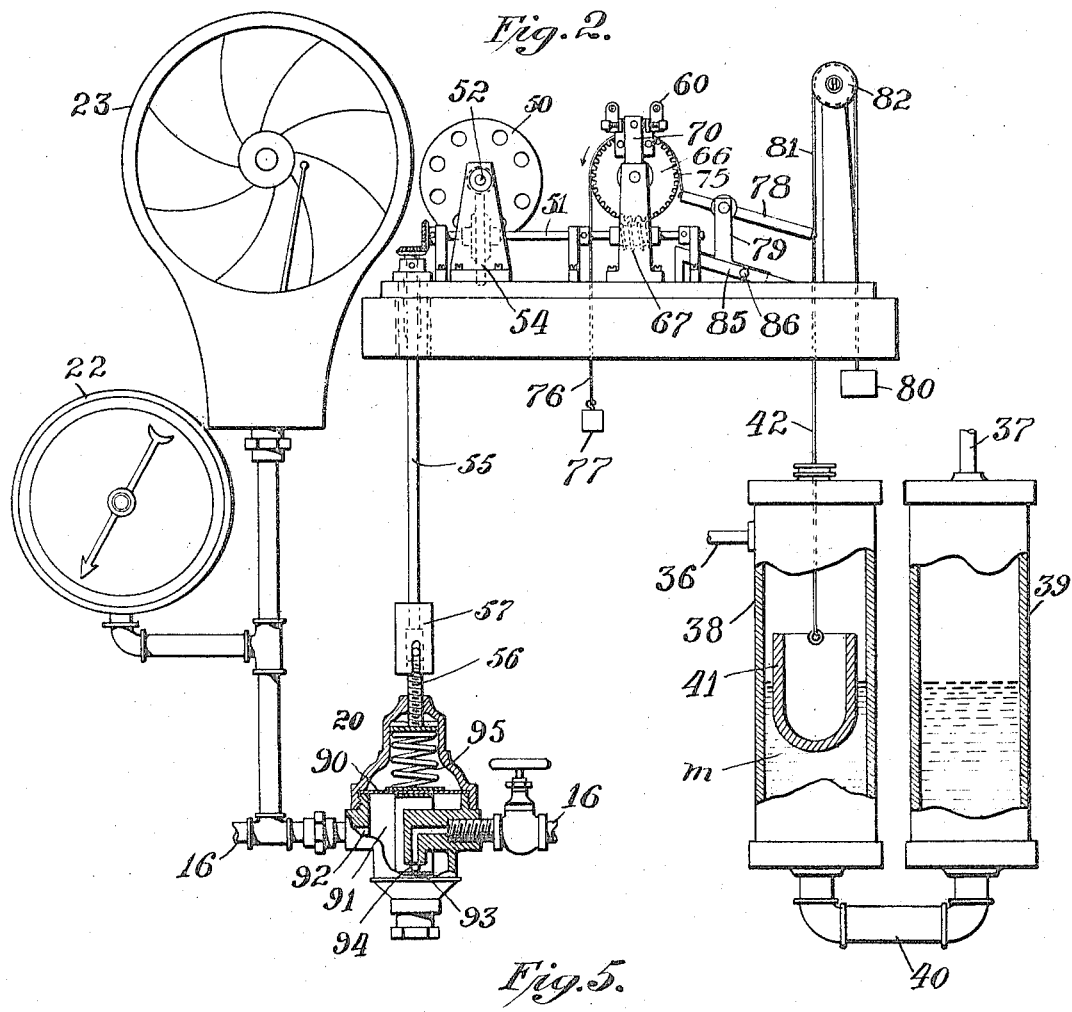
Fig. 2 is an enlarged view of a portion of said apparatus including the electrical controlling mechanism and showing the electrical controlling mechanism in side elevation.
Figure 3:
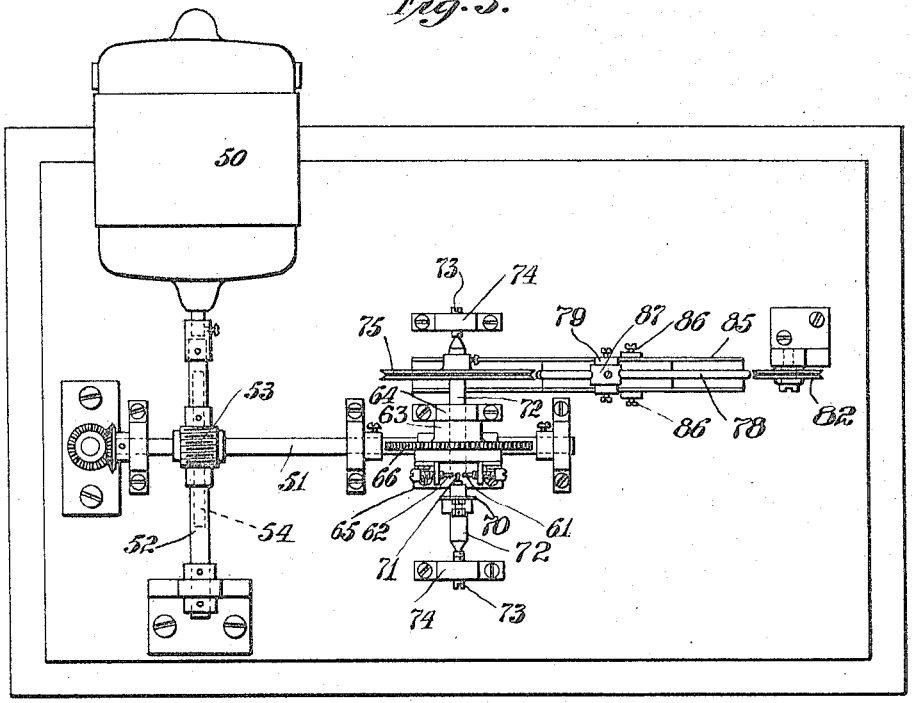
Figs. 3 and 4 are plan and end views respectively of the electrical controlling mechanism further enlarged.
Figure 4:
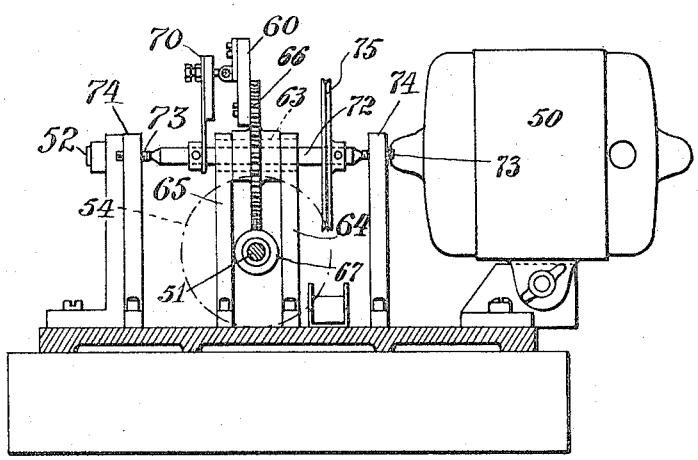

Referring to the electrical controlling and operating mechanism as shown in Figs. 2, 3 and 4, such mechanism in the illustrative embodiment shown comprises an electric motor 50, connections from the motor for adjusting the valve 20, and controlling mechanism for controlling the operation of the motor according to the movement of the float 41. The motor 50 may be of any suitable kind, but is best, as shown, a rotary motor of a type adapted to drive its shaft in either direction according to the connections for supplying current thereto. The driving connections from the motor to the valve 20 are arranged to very largely reduce the motion transmitted and as shown include a shaft 51 which is driven from the motor shaft 52 through a worm 53 on the motor shaft meshing with the worm wheel 54 on the shaft 51, the valve being operated from the shaft 51 through a shaft 55 which is connected with the shaft 51 by bevel gears. The valve 20 as shown is adjusted by the usual screw rod or screw stem 56 which as it is turned in one direction or the other moves longitudinally. The connection between the shaft 55 and the valve stem should, therefore, be one to permit of such longitudinal movement of the valve stem and as shown the connecting means consists of a socket-piece or sleeve 57 mounted on the end of the shaft and into which the end of the valve stem extends and with which it is caused to turn by a pin and slot connection as shown.

The operation of the motor for adjusting the valve 20 is controlled by means of circuit controlling mechanism comprising two movable and relatively movable circuit controlling members, one of which is moved and positioned according to the adjustment of the valve and the other of which is moved and positioned according to the movement and position of the float 41, and which members are so connected in the motor circuits and so arranged that a circuit closing relative movement between said members in one direction will cause the motor to operate the valve to reduce the chlorin supply and the circuit closing relative movement between said members in the opposite direction will cause the motor to run in the opposite direction to operate the valve to increase the chlorin supply. In the apparatus shown, the circuit controlling member 60 which is positioned according to the adjustment of the valve carries two contact terminals 61 and 62 and is carried by a hub or short hollow shaft 63 journaled to oscillate in standards 64 and 65, which hub also carries a worm gear 66, which may be a segmental gear, and which engages a worm 67 on the shaft 51 so that as the shaft 51 rotates in one direction or the other the circuit closing member 60 will be given a corresponding but short oscillating movement. The other circuit controlling member 70 which is operated and positioned according to the movement and position of the float 41 has in the apparatus shown a single contact terminal 71 which extends between the contact terminals 61 and 62, and this controlling member is carried by a shaft 72 which extends through the hollow shaft or hub 63 and is journaled concentrically therewith as by means of bearing screws 73 mounted in standards 74 and recessed to provide bearings for the coned ends of the shaft. The contact points 61, 62 and 71 will of course be suitably insulated from the circuit controlling members.

The shaft 72 has secured fast thereon a grooved disk or pulley wheel 75 over which passes a cord 76 carrying a weight 77 at one end and connected at the other end and at the other side of the pulley wheel with a lever 78 fulcrumed on a standard 79. The rod or wire 42 leading from the float 41 is connected with the other end of the lever 78 and a counterbalancing weight 80 to work against the weight of the float 41 is also connected with the lever 78, as by means of a cord 81 leading from the weight upward about a pulley 82 and downward to connect with the end of the lever 78 to which the rod 42 is connected. To provide for adjusting the position of the fulcrum point of the lever 78 to vary the movement imparted to the pulley wheel 75 and shaft 72 by a given movement of the float 41, the standard 79 is made adjustable longitudinally of the lever, as by being mounted to slide in a guideway 85 to which it may be clamped in position by screws 86, and the lever rod extends through a fulcrum block 87 which is pivotally mounted in the bifurcated upper end of the standard and in which the lever rod is slidable for adjustment when the standard is adjusted, a set screw being provided for securing the lever rod in its adjusted position in the block 87.

Figure 5:
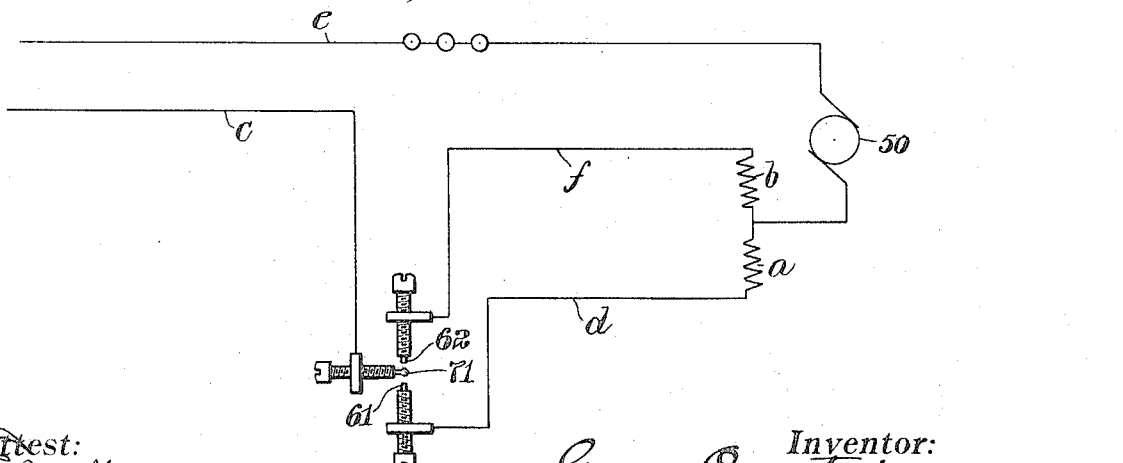
Fig. 5 is a diagrammatical view illustrating the electrical connections.

Fig. 5 shows diagrammatically the motor 50 represented as a single-phase alternating current motor having two field coils for operation of the motor in opposite directions, the circuit connections being such that when the contact terminal 71 is in engagement with the terminal 61 the circuit will be completed from the line c through terminals 71 and 61, wire d, field coil a and motor armature to the line e to cause the motor shaft to be driven in the direction to adjust the valve to increase the supply of chlorin; and when the contact terminal 71 is in engagement with the terminal 62 circuit will be similarly closed through wire f and field coil b to cause the motor to operate in the opposite direction to close down the valve 20.

When the mercury rises in the chamber 38 thereby raising or tending to raise the float 41, the lever 78, under the influence of the weight 80 overbalancing the weight 77, is moved to cause the pulley 75 and shaft 72 to rotate over to the right in Fig. 2 as indicated by the arrow, thereby moving the circuit controlling member 70 to bring the contact terminal 71 into engagement with the terminal 61 thereby closing circuit to cause the motor to operate to drive its shaft 52 to turn the shafts 51 and 55 in the direction to screw the valve stem 56 inward and adjust the valve to increase the pressure under which the chlorin is supplied therefrom. The rotation of the shaft 51 acting through the worm 67 and gear 66 moves the controlling member 60 to the right in Fig. 2 or in the direction to carry the terminal 61 away from the terminal 71 to break the motor circuit. If then the circuit-controlling member 70 is moved farther over to the right under the control of the float 41 the contact between the terminals will be maintained and the circuit will remain closed and the motor continue in operation to turn the valve stem and to move the member 60 until no further movement is imparted to the controlling member 70, whereupon continued movement of the controlling member 60 will carry its contact terminal 61 away from the terminal 71 to break the circuit and stop the motor. The controlling apparatus will then remain inoperative until movement of the float 41 caused by a rise or drop in the level of the mercury in the chamber 38 again causes the controlling member 70 to move to carry its contact terminal into engagement with one of the terminals 61 or 62. Further upward movement of the float will move the member 70 to carry the terminal 71 again into engagement with the terminal 61 to cause a further operation of the motor in the direction to adjust the valve for a further increase in the chlorin supply. If, however, the movement of the float be downward, then the weight of the float acting with the weight 77 will overcome the weight 80 and the pulley 75 and shaft 71 will be caused to rotate over to the left in Fig. 2, thereby moving the circuit closing member 70 to bring its terminal 71 into engagement with the terminal 62, to close the circuit to cause the motor to drive its shaft in the direction to turn the shafts 51 and 55 in the direction to screw the valve stem outward to reduce the pressure under which the chlorin is supplied and thereby reduce the supply of chlorin. The rotation of the shaft 51 will then at the same time cause a retreating movement of the circuit controlling member 60 in the direction to carry its terminal 62 away from the terminal 71, which movement when the controlling member has reached a position corresponding to the level of the mercury in the chamber 38 will result in the opening of the motor circuit and termination of the adjusting movement of the valve stem.

It will be seen that for any change of level of mercury in the chamber 38 and in the position of the float 41 the controlling apparatus will operate to adjust the valve, and that the direction in which the valve stem is turned will correspond to the direction in which the float 41 moves and the amount of movement or number of turns of the valve stem at any such operation of the controlling apparatus will be proportional to the extent of movement of the float. By adjusting the fulcrum of the lever 78 to change the relative lengths of the two arms of the lever, the ratio of movement of the valve stem to the movement of the float 41 may be varied. The controlling apparatus should of course be adjusted so that when the float is in the position which it takes when there is no flow of water through the conduit and therefore no difference in pressure in the two chambers 38 and 39 the circuit controlling member 70 will be in position to have caused the valve 20 to be closed to cut off the supply of chlorin. This adjustment may be readily effected by suitably adjusting the operating connections between the float and the member 70 or the connections between the motor and the valve. And the lever 78 should best be adjusted so that when the apparatus is in the no-flow position it will stand inclined somewhat in the direction in which it is moved when the float 41 moves toward its no-flow position as shown in Fig. 2. The guideway 85 is also similarly inclined to extend parallel with the no-flow position of the lever, in order that adjustment for changing the ratio between the supply of chlorin and the quantity of water flowing may be made without otherwise disturbing the adjustment between the float and the controlling mechanism.

The regulating or adjusting device which is operated or controlled by the electrical controlling apparatus to vary the supply of chlorin according to the amount of water flowing through the conduit, is in the apparatus shown in the drawings an adjustable pressure reducing and regulating valve and is shown in Fig. 2 as a valve of this kind of the type having a diaphragm which is subject to the pressure of the outgoing gas on one side to move the diaphragm to close the valve orifice and which is moved in the other direction or to open the valve orifice by the force of a spring which is adjustable to vary such opening force exerted on the diaphragm, thereby varying the gas pressure on the outlet side of the valve under which the diaphragm will be moved to close the valve orifice and at which pressure the gas on the outlet side of the valve will therefore, be maintained. As shown, the diaphragm 90 forms one side of a valve chamber 91 from which the gas is discharged through an outlet 92 to which the portion of the pipe 16 leading from the valve connects, and the diaphragm carries a seat 93 which by movement of the diaphragm under pressure of the gas in the chamber closes against an inlet nozzle 94. A spring 95 bears against the diaphragm to move it against the pressure of the gas in the chamber 91 to carry the seat 93 away from the gas inlet nozzle, and this spring is adjusted to vary the pressure under which the gas is supplied from the valve by means of the usual screw stem 56.

In the operation of the illustrated apparatus as a whole, the shut-off valve 17 being open and the pressure reducing and regulating valve 25 being set to effect a suitable reduction in the pressure of the chlorin gas, the amount of gas passing through the tower 10 will then depend, as before explained, upon the adjustment of the valve 20, and the gas will be absorbed within the tower by a minor flow of water passing downward through the tower, and the chlorinated water will be continuously supplied through pipe 30 to the water flowing through the conduit 31, and the rate at which the chlorin is thus supplied to the water to be treated will depend upon the pressure under which the gas is supplied from the valve 20 and will be controlled by said valve and varied by adjusting said valve.

When there is no movement of the water through the conduit 31 the pressure in the tubes 36 and 37 and in the chambers 38 and 39 will be equal, and the mercury will stand at the same level in both chambers, and the position of the float 41, of the controlling apparatus and of the valve 20 will be that in which the valve is completely shut off to stop all flow of chlorin gas through it. When water is flowing through the conduit 31, however, there will be a drop in pressure from the entrance end of the Venturi tube to the critical point thereof and the difference in pressure between two longitudinally separated points, as the points at which the tubes 36 and 37 enter, will vary closely with the square of the velocity of flow of the water through the conduit, and the mercury in the chambers 38 and 39 will flow from one chamber to the other to adjust itself to such difference in pressures as transmitted through the tubes 36 and 37, the mercury in the chamber 38 rising with an increase in flow velocity of the water and falling with a decrease in such flow velocity, and the surface level of the mercury in the chamber 38 above the normal level will vary with the square of the velocity of the water flowing through the conduit, or proportionately to the square of variations in the quantity of water flowing through the conduit. The electrical controlling apparatus actuated or controlled by and in accordance with the movements of the float, the position of which is determined by the surface level of the mercury in the chamber 38, will automatically adjust the valve 20, the valve stem being turned in the direction to move it inward or outward according as the float moves upward or downward, and the amount of movement of the valve stem being proportionate to the movement of the float in the ratio determined by the controlling apparatus and which ratio may be varied by adjusting the fulcrum of the lever 78. The direction and extent of the longitudinal movement of the valve stem will, of course, be in direct proportion to the direction and extent of the turning movement or number of turns given to the stem, and since the pressure under which gas is supplied by the valve 20 varies in direct proportion to the pressure exerted by its diaphragm spring, and the pressure exerted by the spring varies in direct proportion to its compression by the valve stem, or to the movement of the valve stem, therefore, the pressure under which gas is supplied by the valve will vary directly in proportion to variations in the difference in pressure developed by the Venturi tube in the water flowing through the conduit, or proportionately, or approximately proportionately, to the square of variations in flow of the water through the conduit. And since the amount of gas passing through the orifice 21 varies proportionately to the square root of the pressure under which the gas reaches the orifice, the amount of gas supplied to the tower, and therefore, the amount of chlorin supplied to the water in the conduit, will be varied approximately in direct proportion to variations in the amount of water flowing through the conduit.

In using the apparatus the fulcrum of the lever 78 will be adjusted until the desired proportionate supply of the chlorin is secured, and thereafter this proportionate supply of chlorin will be approximately maintained.

What is claimed is:

1. Apparatus for treating flowing water, comprising means for supplying a treating agent under pressure to the water to be treated, an adjustable automatically operating pressure reducing and regulating valve for controlling the rate of supply of the treating agent, a controlling member, means for positioning said controlling member according to the quantity of water flowing, and electrically controlled adjusting means for operating according to the position of said controlling member to automatically adjust said pressure reducing and regulating valve to maintain under variations in the quantity of water flowing a fixed ratio between the rate of supply of the treating agent and the quantity of water flowing.

2. Apparatus for treating flowing water, comprising a source of supply of a treating gas under pressure, means for supplying said gas to the water to be treated, means for determining the rate of supply of said gas including an adjustable automatically operating pressure reducing and regulating valve, a controlling member, means for positioning said controlling member according to the quantity of water flowing, and electrically controlled adjusting means operating according to the position of said controlling member to automatically adjust said pressure reducing and regulating valve to maintain under variations in the quantity of water flowing a fixed ratio between the rate of supply of the treating agent and the quantity of water flowing.

3. Apparatus for treating flowing water, comprising means for supplying a treating agent under pressure, an adjustable automatically operating pressure reducing and regulating valve for controlling the rate of supply of the treating agent, a controlling member the position of which varies with variations in the quantity of water flowing, and electrically operated means for adjusting said valve including circuit controlling means controlled by said controlling member, whereby a fixed ratio is maintained between the rate at which the treating agent is supplied to the water and the quantity of water flowing.

4. Apparatus for treating flowing water, comprising means for supplying a treating agent under pressure, an adjustable automatically operating pressure reducing and regulating valve for controlling the rate of supply of the treating agent, a controlling member the position of which varies with variations in the velocity of flow of the water, and electrically operated means for adjusting said valve including circuit controlling means controlled by said controlling member, whereby a fixed ratio is maintained between the rate at which the treating agent is supplied to the water and the quantity of water flowing.

5. Apparatus for treating flowing water, comprising means for supplying a treating gas to the water, means for controlling the rate of supply of said gas including adjustable automatically operating pressure reducing and regulating means, a controlling member, means for positioning said controlling member according to the quantity of water flowing, and electrical controlling mechanism for adjusting said pressure reducing and regulating means according to the position of said controlling member.

6. Apparatus for treating flowing water, comprising means for supplying a treating gas to the water, means for controlling the rate of supply of said gas including adjustable automatically operating pressure reducing and regulating means, a controlling member, means for positioning said controlling member according to the velocity of flow of the water, and electrical controlling mechanism for adjusting said pressure reducing and regulating means according to the position of said positioning member.

7. Apparatus for treating flowing water, comprising means for supplying a treating agent to the water, electrically operated means for controlling the rate of supply of the treating agent, means for producing a difference in pressure between separated points in the flowing water, and means controlled by the difference in pressures developed in the flowing water for controlling the circuits to said electrically operated means to cause the same to operate to maintain for varying quantities of water flowing a fixed ratio between the rate of supply of the treating agent and the quantity of water flowing.

8. Apparatus for treating flowing water, comprising means for supplying a treating agent under pressure, a flow controlling orifice through which the treating agent passes, an adjustable automatically operating pressure reducing and regulating valve for determining the pressure under which the treating agent reaches said orifice, a controlling member the position of which varies with variations in quantity of water flowing, and electrically operated means controlled according to the position of said controlling member for adjusting said pressure reducing and regulating valve to automatically regulate the rate of supply of the treating agent.

9. Apparatus for treating flowing water, comprising means for supplying a treating agent to the water, means for producing a difference in pressure between separated points in the flowing water, a U-shaped chamber containing a liquid of greater specific gravity than the water, connections for subjecting the surface of the liquid in the two arms of said chamber to the respective pressures developed at such separated points in the flowing water, a float supported by said liquid, and means for controlling the rate of supply of the treating agent including electrically controlled adjusting means and circuit controlling means operated according to the movement of said float.

10. Apparatus for treating flowing water, comprising a conduit for the water to be treated, a Venturi tube interposed in said conduit, means for supplying a treating agent to the water flowing through the conduit, a pressure regulator for controlling the rate of supply of the treating agent, and electrically operated means controlled by a difference in pressure developed by the Venturi tube between longitudinally separated points in the flowing water for controlling said pressure regulator to automatically regulate the rate of supply of the treating agent.

11. Apparatus for treating flowing water, comprising a source of gaseous chlorin, means for producing a separate minor flow of water, means for supplying a controlled amount of such chlorin to such minor flow of water to be absorbed thereby, means for supplying the minor flow of water so treated to the main flow of water to be treated, a controlling member, means for positioning said member according to the quantity of flowing water to be treated, and electrical controlling mechanism for automatically controlling the rate of supply of such chlorin to the minor flow of water according to the position of said controlling member to maintain a fixed ratio between the rate of supply of chlorin and the quantity of water to be treated flowing.

12. Apparatus for treating flowing water, comprising means for supplying a treating agent to the water, electrically operated means for controlling the rate of supply of the treating agent, and circuit controlling mechanism for controlling the circuits to said electrically operated means comprising movable and relatively movable circuit controlling members one of which is moved and positioned according to the operation of said electrically operated means and another of which is moved and positioned according to variations in the quantity of water flowing.

13. Apparatus for treating flowing water, comprising means for supplying a treating agent to the water, electrically operated means for controlling the rate of supply of the treating agent, a controlling member, means for positioning said member according to the quantity of water flowing, and circuit controlling mechanism for controlling the circuits to said electrically operated means comprising two movable and relatively movable circuit controlling members the position of one of which is controlled by said electrically operated means and the position of the other of which is controlled by said controlling member.

14. Apparatus for treating water, comprising means for supplying a treating agent to the water, regulating means for controlling the rate of supply of the treating agent, and electrically controlled means for adjusting said regulating means including circuit controlling mechanism comprising two movable and relatively movable circuit controlling members one of which is moved and positioned according to the adjustment of said regulating means and the other of which is moved and positioned according to the quantity of water to be treated.

15. Apparatus for treating flowing water, comprising means for supplying a treating agent to the water, means for regulating the rate of supply of the treating agent including a pressure reducing and regulating valve having a spring-pressed diaphragm and a screw stem for regulating the pressure of the spring, and adjusting means for automatically adjusting said valve stem to maintain under variations in the quantity of water flowing a fixed ratio between the rate of supply of the treating agent and the quantity of water flowing.

16. Apparatus for treating flowing water, comprising a source of supply of a treating gas under pressure, means for supplying said gas to the water to be treated, means for determining the rate of supply of said gas including a pressure reducing and regulating valve having a spring-pressed diaphragm and a screw stem for adjusting the pressure of said spring, and means controlled according to the velocity of flow of the water for adjusting said valve stem, whereby the amount of turning movement given to the valve stem will vary approximately in proportion to the square of variations in the quantity of water flowing.

17. Apparatus for controlling the flow of fluids, comprising means for supplying the fluid under pressure, a pressure regulator for controlling the rate of supply of the fluid, and electrically controlled adjusting means for automatically adjusting said pressure regulator according to variations in flow of an independently supplied fluid.

18. Apparatus for controlling the flow of fluids, comprising means for supplying the fluid under pressure, a supply passage provided with a measuring orifice, an adjustable automatically operating pressure regulator for controlling the pressure under which the fluid reaches the measuring orifice, electrically operated means for adjusting said pressure regulator, a controlling member, means for positioning said member according to variations in flow of an independently supplied fluid, and means for controlling the operation of said electrically operated means according to the position of said controlling member.

19. Apparatus for controlling the flow of fluids, comprising a supply passage, a valve for controlling said supply passage, and electrically controlled adjusting means for adjusting said valve including circuit controlling mechanism comprising two movable and relatively movable circuit controlling members one of which is moved and positioned according to the adjustment of the valve and the other of which is moved and positioned according to variations in flow of an independently supplied fluid.

20. Apparatus for controlling the flow of fluids, comprising a supply passage, a valve for controlling said supply passage, a controlling member the position of which varies with variations in flow of an independently supplied fluid, an electric motor for adjusting said valve, circuit controlling mechanism for controlling the circuits to said motor comprising two movable and relatively movable circuit controlling members one of which is moved and positioned by the operation of the motor and the position of the other of which is controlled by said controlling member.

21. Apparatus for treating water, comprising a source of supply of a treating gas under pressure, means for supplying said gas to the water to be treated, means for determining the rate of supply of said gas including an adjustable automatically operating pressure reducing and regulating valve, a controlling member controlled according to variations in the quantity of water flowing, and electrically controlled adjusting means for automatically adjusting said pressure reducing and regulating valve to vary the rate of supply of the treating gas according to variations in the quantity of water to be treated, said electrically controlled means including circuit controlling means controlled by said controlling member.

In testimony whereof I have hereunto set my hand in the presence of two subscribing witnesses.

GEORG ORNSTEIN.

Witnesses:
 A. L. KENT,
 D. A. DAVIES.